United States Patent [19]

Moore

[11] Patent Number: 5,287,461

[45] Date of Patent: Feb. 15, 1994

[54] METHOD AND APPARATUS FOR REMOTELY ACCESSING A PLURALITY OF SERVER CONSOLES

[75] Inventor: Gregory J. Moore, Pepperell, Mass.

[73] Assignee: Sun Microsystems, Inc., Mountain View, Calif.

[21] Appl. No.: 786,091

[22] Filed: Oct. 31, 1991

[51] Int. Cl.$^5$ .............................................. G06F 13/12
[52] U.S. Cl. ................................... 395/275; 395/200
[58] Field of Search ............................... 395/340, 358

[56] References Cited

U.S. PATENT DOCUMENTS

| | | | |
|---|---|---|---|
| 4,714,922 | 12/1987 | Cripps et al. | 340/825 |
| 4,768,087 | 8/1988 | Toub et al. | 358/84 |
| 4,929,940 | 5/1990 | Franaszek et al. | 340/825.02 |
| 4,959,776 | 9/1990 | Deerfield et al. | 364/200 |
| 4,968,977 | 11/1990 | Chinnaswamy et al. | 340/825.8 |
| 5,142,624 | 8/1992 | Patrick, II | 395/200 |
| 5,165,038 | 11/1992 | Beard et al. | 395/800 |
| 5,175,817 | 12/1992 | Adams et al. | 358/200 |
| 5,218,697 | 6/1993 | Chung | 398/680 |
| 5,239,577 | 8/1993 | Bates et al. | 379/201 |

Primary Examiner—Dale M. Shaw
Assistant Examiner—Christopher B. Shin
Attorney, Agent, or Firm—Blakely Sokoloff Taylor & Zafman

[57] ABSTRACT

A method and apparatus providing remote access to server consoles in a network is disclosed. The method and apparatus provides remote access by utilizing a single server designated an access server, multiple serial port means attached to this single access server, and a plurality of additional servers coupled to this multiple serial port means. The method and apparatus couples the server console lines to the serial ports of the multiple serial port means as well as server console terminals. Remote access is accomplished by gaining access to the access server, which then provides access to any one of the serial ports associated with the access server, thereby providing remote access to any one of the plurality of server console lines coupled to the multiple serial port means. This capability is accomplished while local accessibility to the server console terminals is maintained.

8 Claims, 4 Drawing Sheets

METHOD AND APPARATUS FOR REMOTELY ACCESSING A PLURALITY OF SERVER CONSOLES

BACKGROUND OF THE INVENTION

1. Field of the Invention:

The present invention relates to a method and apparatus for accessing through a single connection a plurality of server consoles coupled together via a computer network. The present invention has particular application to assessing and repairing computer network problems from a remote location.

2. Art Background:

A computer network serves to connect together a plurality of devices, e.g., terminals, computers, etc. Networks typically comprise a plurality of computers some of which function as servers to provide services to the other computers connected to the network.

The functions performed by a server vary depending on the network and the server's place within the particular network. For example, at least one server typically functions as a "file server" for the network. (See, generally, Rinzler and Gancher, *The Computerland Guide To Local Area Networks*, Computerland Books, Pleasanton, Calif. pp. 4–34). A computer functioning as a file server will usually have significantly more data storage capacity than the other computers connected to the network. The networked computers utilize this data storage capacity to store files and databases. Software executed by the file server controls access to these files and databases.

In addition to a fileserver, a network can include servers such as a print server, a data base server, or facsimile server. A print server typically provides access to a centralized printer shared by the network. A network user is able to send a print request to the print server where the request and data to be printed are stored, prioritized with respect to other print requests, and placed on a print queue until the printer is ready to print the job. A database server provides for the centralized storage of a database accessible to the network users. A facsimile server provides users connected to the network access to a facsimile capability located in a centralized facsimile server.

Each server in a network typically has a server console line through which system messages such as error messages are output, and communication with the server is achieved. Typically a terminal (TTY) device, such as a dumb terminal, is connected to the server console line where a user can monitor console messages and communicate with the console. When an error condition occurs on the server, an error message is typically output through the server console line. Remedial actions are frequently taken in response to these error messages. Responding to server error messages, and communicating with the server console, become important when an individual wishes to "troubleshoot" an error condition or when the individual wishes to reboot the server.

Typically, a computer manufacturer, or technicians associated with a computer manufacturer, are called upon to service a server. Unfortunately, the server is often at a remote location, far from the manufacturer or technician. Under such circumstances, the manufacturer or technician is essentially faced with three options.

The first option is to travel to the remote location and attend to the server. This option can be costly and present logistical problems. The second option is to work over the phone with an individual at the remote site, asking that individual to describe the error messages, communicate with the server over the console terminal, and take appropriate remedial actions. This option is prone to miscommunication, frustration, and resultant ineffective repair. The third option is to ask an individual at the remote location to recable the server such that the server itself can "communicate" over the telephone lines with the manufacturer or technician. This option is also prone to miscommunication and frustration, often exacerbating the problem through the inadvertent displacement or damaging of network cables.

SUMMARY OF THE INVENTION

It is therefore an object of the present invention to provide a method and apparatus for remotely accessing a plurality of server consoles.

It is further an object of the present invention to provide a method and apparatus for remotely accessing, over a single modem, multiple server consoles by remotely accessing a single server designated access server.

It is further an object of the present invention to provide, through such remote access, a method and apparatus for remotely remedying problems associated with server error messages.

The method and apparatus of the present invention provide for remote console access to a plurality of server consoles through a single connection. A server is designated to function as an access server. A multiple serial port means is attached to the access server's system bus. A conjunctive device couples the server console lines of a plurality of servers to both the ports on the multiple serial port means and the server console terminals. In this fashion, the serial console line for each server has the capability to transmit to and receive from both a serial port associated with the access server and the console terminal corresponding to this particular server. To perform such functions such as to receive console messages, perform debug operations and reboot the server, an external connection, connected to the serial port of the access server, provides access to any of the server console lines. In the preferred embodiment, a modem is used to gain remote access to the access server, which in turn provides remote console access to any of the server console lines.

BRIEF DESCRIPTION OF THE DRAWINGS

The objects, features and advantages of the present invention will be apparent from the following detailed description of the invention in which.

DETAILED DESCRIPTION OF THE INVENTION

Figure 1:
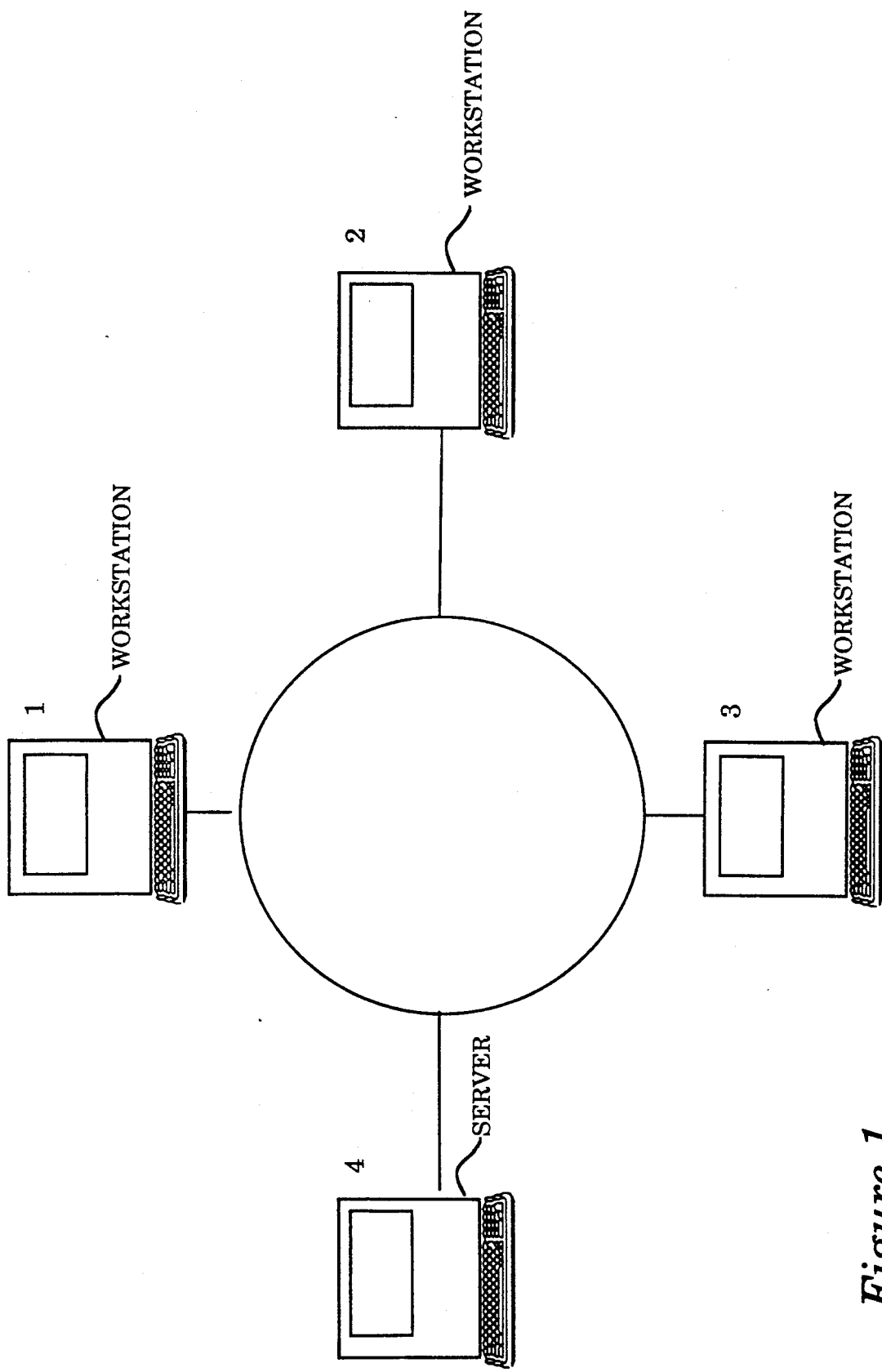
FIG. 1 illustrates a computer network of workstations, one of which is designated to function as a server.

FIG. 1 is illustrative of a network of users and servers. This type of network is shown to illustrate the application of the present invention; however it will be appreciated that the method and apparatus of the present invention is not limited to this particular type of network, but can generally be applied to any type of network utilizing a server.

Referring to FIG. 1, computer workstations 1, 2, 3, and 4, are connected together in a network. This particular type of network has a "ring topology" because the users in the network are linked together in a ring-like fashion. One or more of the workstations functions as a server providing services to the users of the network. For example, workstation 4 could function as a server, providing services to workstations 1, 2, and 3. Other types of network topologies do exist. (See, generally, Rinzler and Gancher, *Computerland Guide To Local Area Networks* pages 13-14) As will be appreciated, these alternative network topologies would be fully compatible with the present invention.

Figure 2:
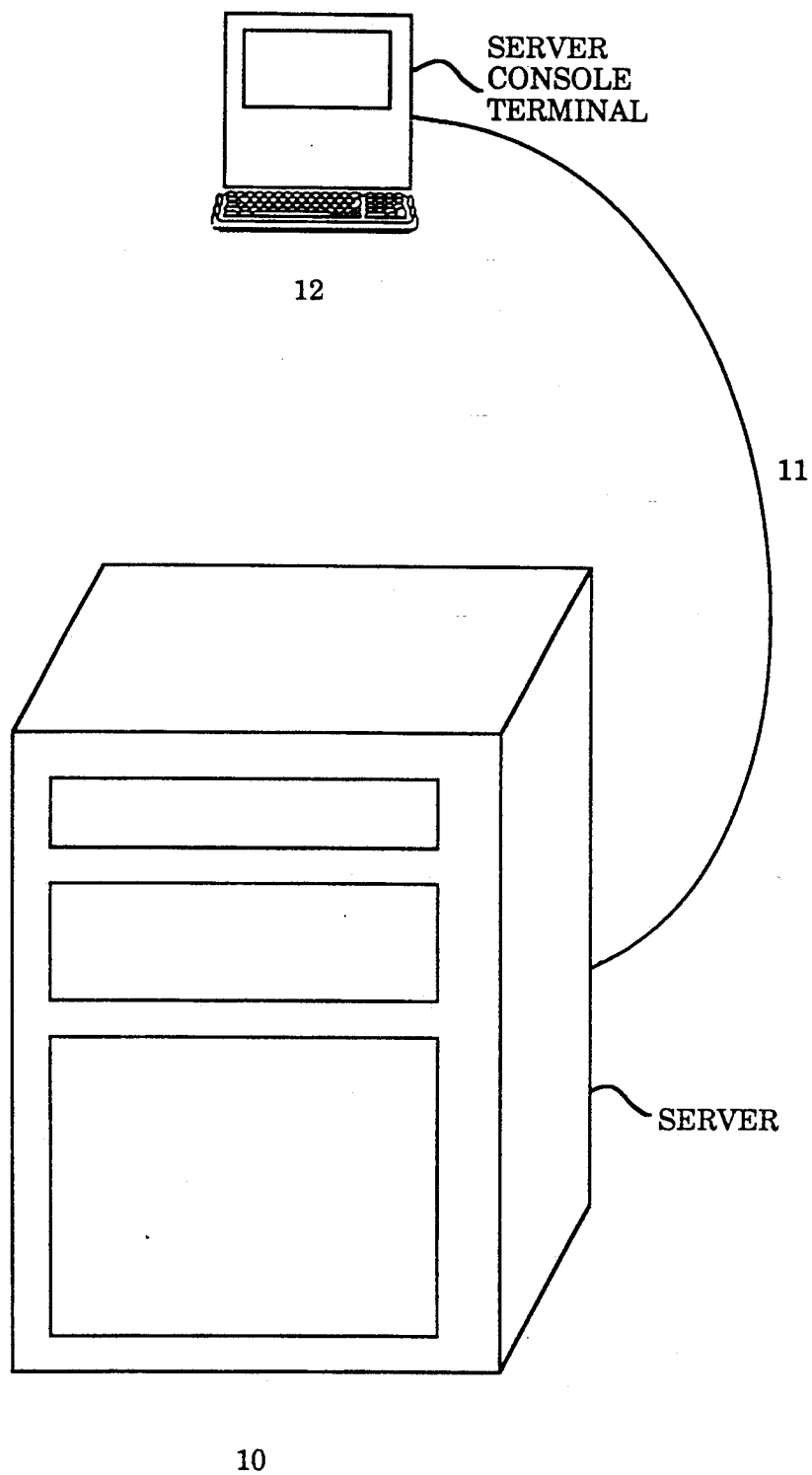
FIG. 2 illustrates a server with server console line and server console terminal.

FIG. 2 illustrates a typical server with server console line and server console terminal for displaying error messages and transmitting commands, instructions and messages to the server console. In FIG. 2, exemplary server 10 has a server console line 11 which connects the server to server console terminal 12. Typically, when a server is experiencing an error condition, it outputs the error message and any diagnostics over server console line 11 to be displayed on server console terminal 12. Communication with the server console is also made at the server console terminal 12. Typically an individual communicates to the server 10 over a keyboard located at the server console terminal 12. An individual seeking to attend to an error condition, reads the problem message and diagnostics at server console terminal 12 and takes remedial action such as running additional diagnostics, adjusting certain parameters of the server, and re-booting the server.

Figure 3:
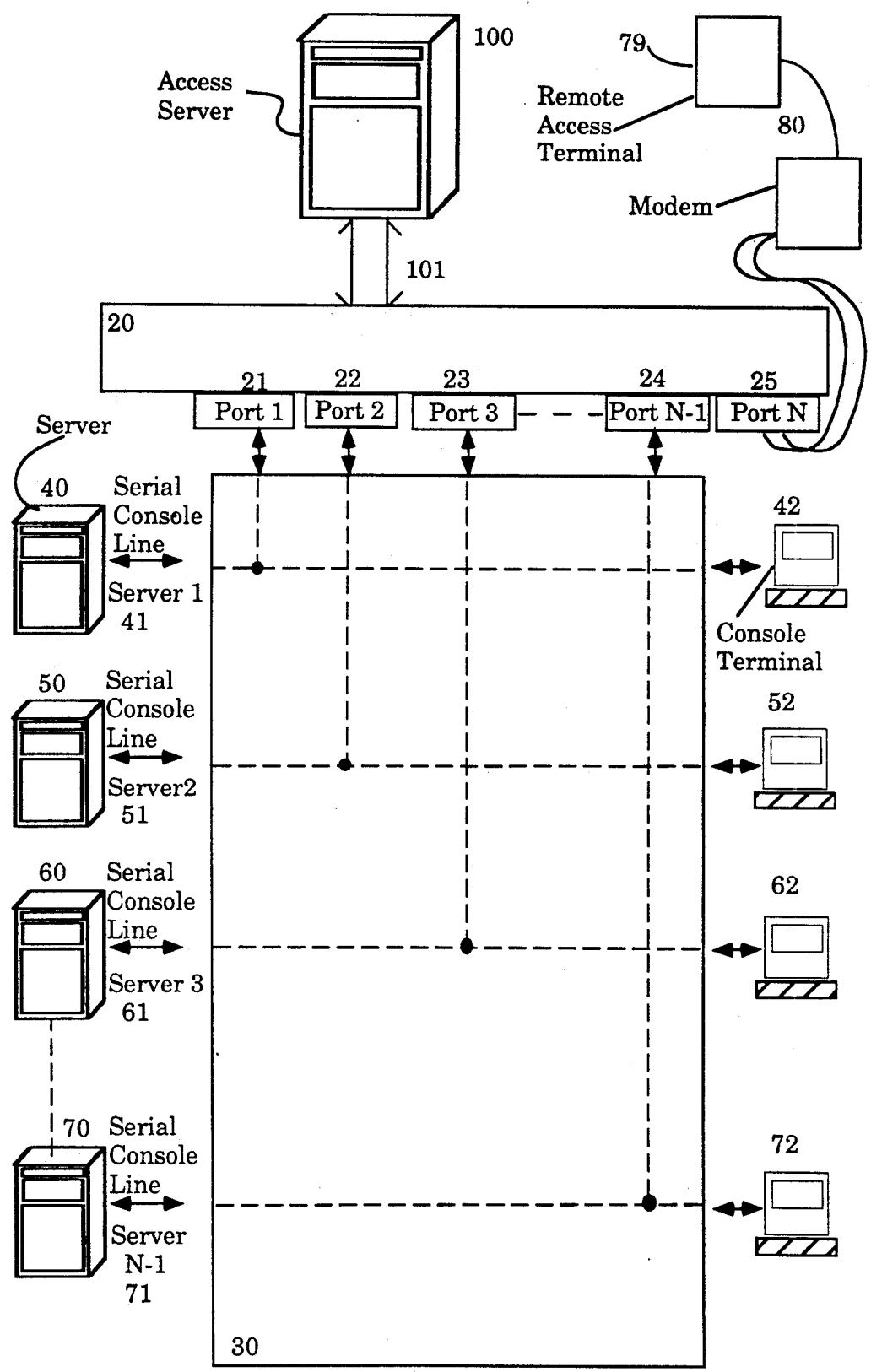
FIG. 3 illustrates the system of the preferred embodiment of the present invention providing remote console access to multiple server consoles.

FIG. 3 illustrates the system of the preferred embodiment of the present invention. This system advantageously allows for remote access to multiple server console lines through remote access to a single server designated as an access server to which the console lines of the servers and the remote access are coupled. Referring to FIG. 3, designated access server 100 has a system bus 101 connected to multiple serial port means 20. Multiple serial port means 20, effectively gives the server access to "n" serial ports. Such multiple serial port means are presently commercially available. For example, a multiple serial port means known as the "ALM card," a card with 16 serial ports, is presently available from Sun Microsystems, Inc. as an option titled "ALM-2 16 Channel Asynchronous Line Multiplexer," Option number 482B.

Multiple serial port means 20 has serial ports 21, 22, 23, 24, and 25. Serial ports 21, 22, 23, and 24 are coupled to conjunctive device 30. Serial port 25 is coupled to a terminal device (identified herein as a "console terminal") for singularly accessing any of the server console lines. Alternatively, the terminal device may be coupled to a separate serial port of the access server not part of the multiple serial port means. A terminal device such as a dumb terminal or an intelligent workstation may be locally coupled to port 25, as may be a remote terminal 79 (identified herein as a "remote access terminal") by connecting a modem 80 to the serial port 25, and providing terminal communication to the port through the modem.

Server 40 is coupled to conjunctive device 30 through serial console line 41 connected to the server console port. Conjunctive device 30 couples the server console line 41 to console terminal 42 and serial port 21. In a similar fashion, conjunctive device 30 couples server 50, console line 51 to console terminal 52 and serial port 22. Similarly, conjunctive device 30 couples serial console line 61 from server 60 to server 60 console line 62 and serial port 23. Thus, in a system of n-1 servers, where server n-1 corresponds to server 70, conjunctive device 30 couples server 70 console line 71 to console terminal 72 and serial port 24.

Figure 4:
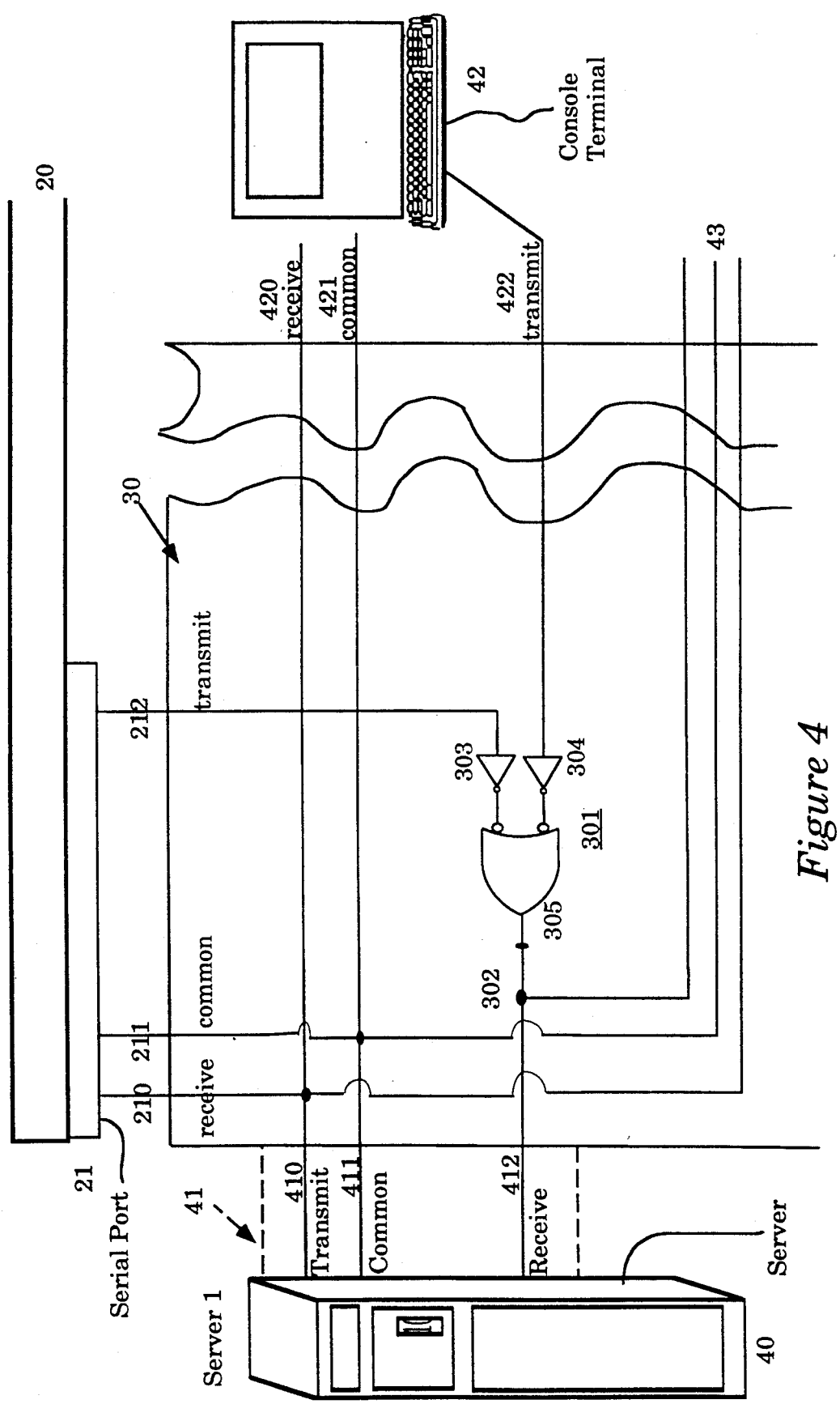
FIG. 4 illustrates the interconnections and hardware elements configured in the conjunctive device of the present invention.

The interconnections and hardware of the conjunctive device will now be described in greater detail. Referring to FIG. 4, this figure generally depicts the upper left portion, of conjunctive device 30 shown in FIG. 3. For simplicity, this FIG. 4 depicts the specific connections and hardware elements which connect server 40 with console terminal 42 and port 21. However, these same connections and elements, in the same configuration, are utilized in each coupling of server console line, server console terminal, and serial port.

Referring to FIG. 4, server 40 has serial console cable line 41. In the preferred embodiment, three lines within the serial console cable line 41 are utilized: the transmit line 410, the common line 411, and the receive line 412. The transmit line is connected to both the serial port receive line 210 from the multiple serial port means 20 and the console terminal receive line 420. This line essentially allows the server 40 to transmit signals to both the serial port 21 and the console terminal 42. This is accomplished with a wired OR circuit such that both the remote terminal and the local console terminal can receive server console messages. Similarly, the common line 411 is connected to both serial port common line 211 and console terminal common line 421.

The receive line 412 must be able to receive signals from the local console terminal and the remote terminal; however, erroneous signals will be generated if both the local console terminal and remote terminal transmit are connected via a wired OR. The console terminal and remote terminal both function as signal drivers. If, for example, the console terminal is inactive and therefore in a logic 1 state, and the remote terminal turns active driving a signal representing a logic 0 state, the resultant signal is indeterminate as the console terminal will attempt to maintain the signal in an inactive state while the remote terminal attempts to drive the combined signal to an active state.

Therefore, the conjunctive device further includes an OR circuit 301 to process the transmit signal driven by console device and the remote device respectively over transmit line 422 and transmit line 212. The OR circuit 301 comprises two inverters 303, 304 and logical OR gate 305. The inverters 303, 304 provide a simple and cost effective way to isolate the transmit signals from one another to permit the combination of the signals input to receive line 412 of the server 40. The logical OR gate 305, having inverted inputs, receives the inverted signals from inverters 303, 304 inverts the signals and logically ORs the signals for input to the server 40 via the receive signal line 412. In this fashion, either a remote accessor over transmit line 212, or a local accessor over console terminal transmit line 422, can transmit to server 40.

As can be seen from FIG. 4, the preceding connections further include connection to a bypass port 43. This bypass port 43 can be utilized to effectively bypass the conjunctive means circuitry if the conjunctive means fails to operate correctly. Bypass is accomplished by adjusting switching means 302 such that elements associated with circuit 301 are no longer connected to server console line 412. Bypass port 43 can now be utilized for server console purposes including debugging and rebooting of the server.

The preferred method of operation of the present invention can be described with respect to the system illustrated in FIG. 3. A modem 80 is coupled to multiple serial port means 20 at serial port 25. Alternatively the modem may be coupled through a different serial port such as a serial port of the access server not part of the multiple serial port means. This modem allows for remote access to access server 100 through serial port 25. An individual seeking remote access to a particular server console line first telephonically utilizes modem 80 to make contact with access server 100. Once contacted, access server 100, through a select coupling means such as a serial port access program, allows the individual to access any one of the serial ports on serial port means 20. The individual requests access to the serial port corresponding to the desired server console line and once granted access to this particular serial port, the individual connects to the server console line corresponding to that particular serial port. In this fashion, remote access to multiple server consoles can be accomplished, allowing the individual making remote access to receive from and transmit to the desired server to receive console messages, to perform debugging of the server or to perform a reboot of the server.

It will be appreciated that remote access to a plurality of server consoles has been accomplished through a single modem. In addition, it will be appreciated that this remote access has further been accomplished while still permitting a local user access through a console terminal when the remote user is not accessing the console of the server.

In the preferred embodiment of the present invention, the designated access server 100 is running the UNIX ® operating system (UNIX is a registered trademark of AT&T). A modem is connected to a serial port of the access server. The modem can be connected to one of the serial ports of the multiple serial port means connected to the access server system bus or to a separate serial port of the access server. When a server is powered/started up under the UNIX operating system, a number of initialization procedures are executed including the spawning of "Getty" processes for the terminal lines (serial ports) to the server. When a Getty process senses a hardware connection at one of its I/O ports, a server login program is executed which requires the user to identify themselves by login name and password. Upon entry of a valid login and password, the user is permitted access to the server. For further information on Getty processes, see Maurice J. Bach, *The Design of the UNIX Operating System*, pps 343-344 (Prentice Hall 1986).

A remote user desiring to access a console of one of the servers connects to the modem coupled to the access server. The Getty process initiates a login procedure, and, upon the entry of valid login information, the user is provided access to the access server. The user then initiates a program of a series of commands, referred to above as the select coupling means, to connect the remote user to the serial port linked to the console to be accessed in order to provide a communications link to the serial port and console. Although specially tailored code to access the serial port may be used, preferably a standard terminal access program is utilized, such as the TIP program provided with the SUN Microsystems operating system (SUNOS TM) for execution on Sun Microsystems, Inc. workstations.

Once the connection is made to the serial port, the user can transmit messages to the console, via the serial port and conjunctive means, as well as receive messages issued from the console port. Through this communication, the user may receive error messages, perform debug operations as well as reboot the server. Furthermore, if at any time the user desires to communicate to another server console, the user simply utilizes the terminal access program to disconnect from the current console port and connect to the desired console port.

As can be appreciated from the foregoing, the system and method of the present invention allows for remote console access to multiple servers. Moreover, it accomplishes this capability with the use of a single modem. It will be appreciated that the above-described invention may be embodied in other specific forms without departing from the spirit or essential characteristic thereof. In particular, the invention has been described with respect to particular networks and multiple servers. It should be appreciated that the present invention would be equally applicable and advantageous with respect to any type of network. The present embodiments are, therefore, to be considered in all aspects as illustrative and not restrictive, the scope of the invention being indicated by the appended claims rather than by the foregoing description, and all changes which come within the meaning and range of equivalency are, therefore, intended to be embraced therein.

I claim:

1. A network comprising:
   a remote access terminal;
   a plurality of servers;
   a plurality of console access terminals, each of said console access terminals associated with each of said servers;
   an access server having a plurality of serial ports, each of said serial ports associated with each of said servers;
   a remote console serial port, said remote console serial port connected between said access server and said remote access terminal, said remote access terminal selectively transmitting a signal identifying a selected server; and
   connection means for connecting each of said servers with each of said console access terminals and for connecting said selected server with said remote access terminal; with
   said access server receiving said signal from said remote access terminal and responsively controlling said connection means to connect said remote access terminal to said selected server identified by said signal, said connection means then routing signals from said remote access terminal to said selected server and from said selected server to both said remote access terminal and said console access terminal associated with said selected server.

2. The network of claim 1, wherein each serial port of said access server includes a receive signal line, a common signal line and a transmit signal line, each server includes a receive signal line, a common signal line and a transmit signal line, and each console access terminal includes a receive signal line, a common signal line and a transmit signal line, and wherein said connection means comprises:

an OR-gate, a first inverter and a second inverter;

said OR-gate having first and second inverted inputs and having an output;

said first inverter connected between said first inverted input of said OR-gate and said transmit signal line of said serial port; and said second inverter connected between said second inverted input of said OR-gate and said transmit signal line of said console access terminal;

with said output of said OR-gate connected to said receive signal line of said server, said transmit signal line of said server connected to said receive signal line of said serial port and to said receive signal line of said console access terminal, and said common signal line of said sever connected to said common signal line of said serial port and to said common signal line of said console access terminal.

3. A network comprising:

a remote access terminal;

a plurality of servers;

a plurality of console access terminals;

an access server having a plurality of serial ports, each of said serial ports associated with each of said servers, each of said servers associated with each of console access terminals;

a remote console serial port, said remote console serial port connected between said access server and said remote access terminal, said remote access terminal selectively transmitting a signal identifying a selected server; and connection means for connecting each of said servers with each of said console access terminals and for connecting said selected server with said remote access terminal; with said access server receiving said signal from said remote access terminal and responsively controlling said connection means to connect said remote access terminal to said selected server identified by said signal, said connection means then routing signals from said remote access terminal to said selected server and from said selected server to both said remote access terminal and said console access terminal associated with said selected server;

wherein each serial port of said access server includes a receive signal line, a common signal line and a transmit signal line, each server includes a receive signal line, a common signal line and a transmit signal line, and each console access terminal includes a receive signal line, a common signal line and a transmit signal line, and wherein said connection means includes an OR-gate, a first inverter and a second inverter, said OR-gate having first and second inverted inputs and having an output, said first inverter connected between said first inverted input of said OR-gate and said transmit signal line of said serial port, and said second inverter connected between said second inverted input of said OR-gate and said transmit signal line of said console access terminal, with said output of said OR-gate connected to said receive signal line of said server, said transmit signal line of said server connected to said receive signal line of said serial port and to said receive signal line of said console access terminal, and said common signal line of said sever connected to said common signal line of said serial port and to said common signal line of said console access terminal.

4. In a system interconnecting a remote access terminal to any one of a plurality of servers connected to respective console access terminals, with said system having an access server with a plurality of serial ports, each of said serial ports associated with each of said servers, each server having a respective associated console access terminal, and with said system having a remote console serial port connected to said remote access terminal, a method of connecting said remote access terminal to one of said plurality of servers, said method comprising the steps of:

transmitting a server selection signal from said remote access terminal to said access server identifying a selected server;

determining a serial port corresponding to said selected server;

connecting said determined serial port to said selected server;

transmitting signals from said remote access terminal to said selected server through said determined serial port;

simultaneously transmitting signals from said selected server to both said remote access terminal and said console access terminal associated with said selected server; and transmitting signals from said console access terminal associated with said selected server to said selected server.

5. The method of claim 4, further including the steps of:

transmitting a server disconnection signal from said remote access terminal to said access server indicating an end of communication between said remote access terminal and said selected server; and disconnecting said selected server from said remote access terminal.

6. The method of claim 4, wherein each serial port of said access server of said system includes a receive signal line and a transmit signal line, each server includes a receive signal line and a transmit signal line, and each console access terminal includes a receive signal line and a transmit signal line, and wherein said system includes an OR-gate having first and second inverted inputs and having an output, a first inverter connected between said first inverted input of said OR-gate and said transmit signal line of said serial port, a second inverter connected between said second inverted input of said OR-gate and said transmit signal line of said console access terminal, with said output of said OR-gate connected to said receive signal line of said server and with said transmit signal line of said server connected to said receive signal line of said serial port and to said receive signal line of said console access terminal, and wherein said step of transmitting signals from said remote access terminal to said selected server includes the step of:

transmitting signals along said transmit signal line of said determined serial port through said first inverter and through said first inverted input of said OR-gate onto said receive signal line of said selected server.

7. The method of claim 6, wherein said step of simultaneously transmitting signals from said selected server to both said remote access terminal and said console access terminal associated with said selected server comprises the step of:

transmitting a signal along said transmit signal line of said selected server onto said receive signal line of said determined serial port and onto said receive signal line of said console access terminal associated with said selected server.

8. The method of claim 6, wherein said step of transmitting signals from said console access terminal associated with said selected server to said selected server comprises the step of:

transmitting a signal along said transmit signal line of said console access terminal associated with said selected server through said second inverter and through said second inverted input of said OR-gate onto said receive signal line of said selected server.

* * * * *